United States Patent [19]

Smith

[11] 4,411,950
[45] Oct. 25, 1983

[54] AUTODEPOSITED COATINGS WITH INCREASED SURFACE SLIP

[75] Inventor: Timothy J. C. Smith, Hatfield Township, Montgomery County, Pa.

[73] Assignee: Amchem Products, Inc., Ambler, Pa.

[21] Appl. No.: 264,402

[22] Filed: May 18, 1981

Related U.S. Application Data

[60] Continuation of Ser. No. 66,858, Aug. 15, 1979, abandoned, which is a division of Ser. No. 917,560, Jun. 21, 1978, Pat. No. 4,186,226.

[51] Int. Cl.$^3$ .............................. B32B 5/16; B05D 3/04
[52] U.S. Cl. ..................................... 428/327; 428/328; 428/461; 428/689; 427/340; 148/31.5; 148/6.16; 148/6.2; 524/407; 524/519
[58] Field of Search ............... 428/469, 327, 328, 461, 428/689; 427/435; 148/6.16, 6.2

[56] References Cited

U.S. PATENT DOCUMENTS

| 3,097,105 | 7/1963 | Edmonds | 427/435 X |
| 3,346,522 | 10/1967 | Schuster et al. | 260/17.4 |
| 3,526,532 | 9/1970 | Heilberger | 117/75 |
| 3,585,084 | 6/1971 | Stein Brecher et al. | 427/309 X |
| 3,647,567 | 3/1972 | Schweri | 427/309 X |
| 4,030,945 | 6/1977 | Hall et al. | 427/435 X |
| 4,137,368 | 1/1979 | Miller | 427/435 X |

Primary Examiner—P. Ives
Attorney, Agent, or Firm—Alexis Barron; John S. Child, Jr.

[57] ABSTRACT

In a process wherein a resinous coating is formed on a metallic surface by immersing the surface in an acidic aqueous coating composition containing dispersed particles of resin, wherein said composition forms on said surface a resinous coating which increases in thickness the longer the surface is immersed in the composition and wherein the resinous coating is contacted with an aqueous solution containing Cr in order to improve properties (e.g. corrosion resistance), the surface slip of the applied coating is increased by having dispersed in the Cr-containing solution a polymer which has a lower coefficient of friction than the applied resinous coating.

10 Claims, No Drawings

AUTODEPOSITED COATINGS WITH INCREASED SURFACE SLIP

This is a continuation of pending application Ser. No. 66,858, filed Aug. 15, 1979, now abandoned which is a division of application Ser. No. 917,560, filed June 21, 1978, now U.S. Pat. No. 4,186,266.

BACKGROUND OF THE INVENTION

A relatively recent development in the coating field is the provision of water based coating compositions which are effective, without the aid of externally applied electricity, in forming on metallic surfaces immersed therein organic coatings that increase in thickness or weight the longer the time the surfaces are immersed in the compositions. (For convenience, a coating formed from such a composition is hereafter referred to as "an organic coating which grows with time" or as an "autodeposited coating".) Speaking generally, compositions which are so effective comprise acidic aqueous coating solutions having dispersed therein particles of an organic material such as resin particles. Autodeposited coatings are formed from such compositions as a result of their ability to attack the metal surface and to generate metal ions in amounts which cause the particles to deposit on the surface in a manner such that there is a continuous buildup of organic coating on the surface.

Coatings formed from such compositions are distinctly different from coatings formed by immersing the metallic surfaces in conventional latices, that is, compositions comprising resin particles dispersed in water. The weight or thickness of a coating formed by immersing a metallic surface in a conventional latex is not influenced by the time the surface is immersed in the latex. It is in the main influenced by the amount of resin solids dispersed in the aqueous medium.

Coatings formed from the aforementioned recently developed coating compositions are also distinctly different from coatings formed from earlier known acidic aqueous coating solutions containing dispersed solid resin particles and relatively high amounts of water soluble corrosion inhibitors, such as compounds containing hexavalent chromium. The use of relatively high amounts of corrosion inhibitors in such solutions deters attack of the metallic surface to an extent such that resinous coatings which grow with time are not obtained. Thus, resinous coatings formed by immersing metallic surfaces in such compositions are like those formed from immersing the metallic surfaces in conventional latices in that they do not grow with time.

The use of the recently developed coating compositions which produce coatings which grow with time offers a number of advantages. For example, other factors held constant, they can be used to apply thicker organic coatings to the metallic surface in a shorter period of time and in a one-step operation. Also, the coating thickness can be controlled by varying the immersion time of the metallic surface in the coating composition. In general, coatings which have improved corrosion resistant properties and aesthetic appearance are obtainable. These are but a few of the advantages which flow from the use of said compositions.

While the aqueous acidic coating compositions described above produce excellent coatings, it is frequently desired to increase the corrosion resistance of such applied coatings (as measured, for example, by ASTM B117).

The commonly employed method of increasing the corrosion resistance properties of autodeposited coatings is to contact the wet or unfused applied coating with an aqueous Cr-containing solution. Typically, the aqueous Cr-containing solution can be an aqueous solution of hexavalent chromium, the source of which may be a water or acid soluble chromate or dichromate or $CrO_3$; or an aqueous solution of hexavalent chromium and formaldehyde-reduced forms of hexavalent chromium. For example, see U.S. Pat. Nos.: 3,585,084; 3,592,699; 3,647,567; and 3,795,546.

While the corrosion resistance of the applied autodeposited coatings can be increased by treatment with aqueous Cr-containing solutions, the corrosion resistance obtained will vary from one autodeposited coating to another due to the large variety of resins which can be applied by this method.

In some end use applications it is desired that the resin coated metallic surface have a relatively high degree of surface slip. This is the case in applications wherein the surface of a coated metal part is in movable surface contact with another coated or uncoated metal part and it is desired that the two surfaces slide across one another easily without scratching the coating (e.g. a coated metal track for a sliding door, trunk hinge, door latch, etc.).

One can achieve surface slip in an autodeposited coating by using an aqueous acidic coating solution containing, as the dispersed resin therein, a resin having an inherently high degree of slip (e.g. polytetrafluoroethylene or polyethylene). Unfortunately, the other properties of such autodeposited resins—in particular their corrosion resistance—may not meet the performance criteria for their intended use. Autodeposited coatings of polytetrafluoroethylene and polyethylene display relatively low corrosion resistance by comparison with other types of autodeposited resins. Polytetrafluoroethylene has another drawback in that very high temperatures are required to fuse the applied coating into a continuous film.

It is, therefore, an object of this invention to provide a method of applying an autodeposited coating having a high degree of surface slip while concomitantly providing a high degree of corrosion resistance in the applied coating.

SUMMARY OF THE INVENTION

There is provided in accordance with the teachings of this invention, a method of applying an autodeposited resinous coating which has a high degree of surface slip with no significant sacrifice in corrosion resistance. In the method of this invention an autodeposited resinous coating is first applied to a metallic surface in the known manner. While the applied coating is still wet, that is uncured, it is contacted with an aqueous Cr-containing solution which has dispersed therein particles of a resin which is different from the resin which has been autodeposited on the metallic surface and which has a lower coefficient of friction than the resin which was autodeposited on the metallic surface.

The coating on the metallic surface which has received the treatment described in the foregoing paragraph can then be fused into a continuous film by heating. While not wishing to be bound by any particular theory, it is believed that some of the resin particles dispersed in the aqueous Cr-containing solution are deposited in the surface layers of the autodeposited coating and, upon fusing, become an integral part thereof where they are concentrated and to the extent that they are capable of altering the surface characteristics thereof.

DETAILED DESCRIPTION OF THE INVENTION

Coating compositions which are effective in forming organic coatings which grow with time are known. Examples of such coating compositions are described in U.S. Pat. Nos. 3,585,084; 3,592,699; 3,709,743; and 3,776,848 in British Pat. No. 1,241,991, in South African Pat. No. 72/1146 and in Belgian Patent of Addition No. 811,841.

Speaking generally, the acidic aqueous coating compositions of the aforementioned type function to attack the metallic surface contacted therewith and to generate metal ions in an amount sufficient to directly or indirectly cause organic particles in the region of the metallic surface to deposit thereon in a continuous fashion, that is, in a manner such that there is a buildup in the amount of organic material deposited on the surface the longer the time the surface is in contact with the composition. This deposition of the organic material on the metallic surface is achieved through chemical action of the coating composition on the metallic surface. The use of externally applied electricity which is necessary for the operation of some coating methods, such as the electrocoating method, is not required.

The present invention is used in connection with coatings formed from compositions that contain solid particles of an organic polymer dispersed in the aqueous phase of the composition.

A preferred composition for applying the autodeposited coating in the practice of the present invention is described in Belgian Pat. No. 840,145, issued in the name of Wilbur S. Hall. The preferred compositions has a pH of about 1.6 to about 4 and is prepared from water, a ferric-containing compound, most preferably ferric fluoride, in an amount such that it contains the equivalent of about 0.5 to about 3.5 g/l of ferric iron, about 0.2 to about 5 g/l of HF, a pigment such as carbon black, and about 5 to about 550 g/l of resin particles preferably from 50 to 100 g/l of resin particles, which are all of substantially the same size and substantially chemically homogeneous, that is, each particle is comprised of the same monomeric constituents present in substantially the same proportions of resin particles which are prepared by copolymerizing the following monomers:

(1) about 25 to about 70, and preferably about 40 to about 65 wt. % of a conjugated diene having, for example, 4 to about 9 carbon atoms, such as butadiene or isoprene;

(2) about 5 to about 70, and preferably about 30 to about 65 wt. % of $CH_2=CHR$, wherein R is an aryl or a cyano group, for example, styrene or acrylonitrile;

(3) about 1 to about 50, and preferably about 3 to about 15 wt. % of a vinyl halide such as vinyl chloride or vinylidene chloride; and (4) about 0.5 to about 15, and preferably about 1 to about 4 wt. % of a monoethylenically unsaturated monomer having a functional group selected from the class consisting of amide and carboxylic groups, such as acrylamide, methacrylamide, octyl acid maleate and monoethylenically unsaturated monocarboxylic and dicarboxylic acids having about 3 to about 12 carbon atoms, and preferably about 3 to about 5 carbon atoms, such as, for example: acrylic acid; cinnamic acid; methacrylic acid; crotonic acid; itaconic acid; maleic acid; and fumaric acid.

The resin is used most conveniently in the form of a latex which can be prepared according to available techniques.

A particularly preferred latex contains particles of resin prepared from the aforementioned monomers, which particles are chemically and physically homogeneous. The resin particles of the preferred latex are prepared from styrene, butadiene, vinylidene chloride and methacrylic acid. In addition, the emulsifier content of the preferred latex is about 1 to about 4% based on the resin solids and comprises at least 90 wt. %, most preferably 100 wt. % of an anionic emulsifier such as a sulfonate, for example, sodium dodecylbenzene sulfonate, or a sulfosuccinate, for example, sodium oleoyl isopropanolamide sulfosuccinate, or a mixture thereof.

Although the coating composition can be contacted with the metallic surface in a variety of ways, it is believed that the most widely used method of contact will comprise immersing the metallic surface in the coating composition at room temperature. As mentioned above, the longer the metallic surface is immersed in the coating composition, the greater the buildup in coating thickness. It is believed that for most applications, desired coating thicknesses can be obtained by immersing the metallic surface in the composition for a period of time within the range of about 30 seconds to about 3 minutes. However, it should be understood that longer or shorter periods of time can be used.

Agitating the composition aids in maintaining it uniform. Also, agitation of the composition is effective in improving the uniformity of the coatings formed.

Water rinsing the coated surface after it has been withdrawn from the composition, and before significant drying takes place is effective in removing therefrom residuals such as acid and other ingredients of the bath that adhere to the coated surface. If such residuals are allowed to remain on the coated surface, they may change or adversely affect the quality of the coating. For a specific application, a determination can be made as to whether the residuals cause adverse effects which are not tolerable. If they do, they should be removed, for example, by water rinsing with tap or deionized water. If they do not, this step of removing them can be avoided.

Following any water rinse step that might be employed or after the coated surface is withdrawn from the composition, it is contacted with the aqueous Cr-containing composition of this invention (described in detail below) and then dried. Fusion of the resinous coating renders it continuous, thereby improving its resistance to corrosion and adherence to the underlying metallic surface.

The conditions under which the drying and/or fusion operation is carried out depend somewhat upon the type of resin employed. In general, heat will be required to fuse the resin. The corrosion resistant properties of coatings fused at elevated temperature have been observed to be better than coatings which have been air dried. However, there are applications where air dried coatings can be used satisfactorily. The fusion of the coating should be carried out below temperatures which cause the resinous coating to degrade. Exemplary conditions used in fusing coatings produced according to the present invention are temperatures within the range of about 100° to about 200° C. for periods of time with in the range of about 10 to about 30 minutes, depending on the mass of the coated part. Baking the coating for a period of time until the metallic surface has reached the temperature of the heated environment has been used effectively.

The improvement of this invention comprises contacting the wet or uncured autodeposited coating with an aqueous Cr-containing rinse solution which also contains dispersed particles of a resin, which is different from the autodeposited resin, and which has a coefficient of friction which is lower than that of the autodeposited resin. The rinse solutions of this invention can be produced by dispersing the desired resin, in latex form, in any of the known aqueous Cr-containing solutions used in the prior art to treat autodeposited coatings.

The Cr-containing solution in which the resin is dispersed is typically an aqueous solution of hexavalent chromium or a mixture of hexavalent chromium and reduced forms of chromium.

The Cr-containing solutions containing hexavalent chromium only are typically aqueous solutions of water or acid-soluble chromate or dichromate compounds or $CrO_3$. Useful compounds for this purpose include sodium dichromate, potassium dichromate, sodium chromate, potassium chromate, and lithium chromate.

The Cr-containing solutions containing hexavalent chromium and reduced forms of chromium are described in U.S. Pat. Nos. 3,063,877 and 3,795,546, the disclosures of which are incorporated herein by reference. Such solutions can be prepared from an aqueous concentrate that is made by treating an aqueous solution of chromic acid with formaldehyde to reduce a portion of the hexavalent chromium.

In terms of imparting a maximum degree of slip at the surface of the autodeposited coating, it is preferred that the aqueous Cr-containing solution employed be one which contains only hexavalent forms of chromium. Most preferably, the source of Cr in the solution is sodium dichromate due to its excellent ability to enhance corrosion resistance.

The primary function of the Cr in the treating solution of this invention is the improvement of properties, such as corrosion resistance, of the autodeposited coating. Any amount of chromium in the solutions will improve the properties of the applied coating. It is preferred, however, that the total chromium concentration, including hexavalent and reduced forms of chromium, if present, be at least about 0.1 g/l and preferably at least 0.25 g/l in the treating solutions of this invention. The upper concentration limit of total chromium will generally be dictated by economic considerations in that incremental increases in the Cr concentrations do not produce corresponding improvements in the coatings. Although the Cr can be present in amounts approaching the solubility limit, there generally will be little advantage in using solutions containing more than about 5 grams of Cr per liter.

The resin particles which are dispersed in the aqueous Cr-containing solution are particles of any resin which has a coefficient of friction lower than that of the autodeposited resin being treated. By this is meant that the coefficient of friction between a steel surface and a continuous surface (i.e., a fused surface) of the resin which is dispersed in the Cr-containing solution is less than the coefficient of friction between a steel surface and a continuous surface of the resin which has been autodeposited on the metallic surface. (See, e.g., Handbook of Chemistry and Physics, 56th. Ed., p. F21 for coefficients of friction of various resins). Preferred resins for use in the aqueous Cr-containing solution are polyethylene, polytetrafluoroethylene or mixtures thereof, due to their low coefficients of friction. Suitable polytetrafluoroethylene and polyethylene latices which can be dispersed in aqueous Cr-containing solutions to produce the treating bath used in this invention are commercially available, for example, under the trade names Teflon 30 (polytetrafluoroethylene) and Poly Em 20 (polyethylene).

Any amount of the resin dispersed in the Cr-containing solution will alter the surface slip of the autodeposited coating which is treated with the solution. In terms of imparting a significant degree of surface slip to the autodeposited coating, it is preferred to employ the resin at a concentration of at least about 2.5 g/l, based on grams of resin solids per liter of Cr-containing solution. There is no strict upper limit on the amount of resin which can be dispersed in the Cr-containing solution, however, no particular advantage is gained by employing the resin in the Cr-containing solution at a concentration greater than about 10 g/l.

The aqueous Cr-containing solution in which the resin is dispersed is acidic. The pH of the solution is normally from about 3.0 to 5.0.

There is the further proviso that the resin which is dispersed in the aqueous Cr-containing solution form a stable dispersion therein. This is normally achieved by having a stabilizing amount of a surfactant on the surfaces of the dispersed resin particles. It is preferred to use a nonionic or an anionic surfactant. The concentration of surfactant which is necessary to form a stable dispersion will vary, inter alia, with the pH of the solution, the concentration of resin dispersed in the solution, and the particular type of resin and surfactant used. The skilled worker will be able to determine an efficacious concentration of surfactant without undue experimentation. Typically, we have found that a concentration of from about 5 to 10 weight percent surfactant, based on the weight of dispersed resin, has been sufficient to maintain dispersion stability.

The aqueous Cr-containing solution having the dispersed resin therein is applied to the audodeposited coating on the metallic surface by any convenient means such as by immersing it in a bath consisting of the Cr-containing solution and dispersed resin. The bath is not critical and the temperature can vary from room temperature to about 175° F.

In order to maintain the effectiveness of the treating bath, it is necessary to periodically replenish the dispersed resin in the Cr-containing solution.

The examples which follow are intended to further illustrate the invention described herein and are not intended to unduly limit the scope of the invention. Unless otherwise indicated, all parts and percents are by weight.

The autodepositing coating composition used in the examples was prepared by combining the ingredients indicated below:

| Ingredients | Amounts |
| --- | --- |
| Latex containing about 54% solids | 180 g. |
| Ferric Fluoride | 3 g. |
| Hydrofluoric Acid | 2.3 g. |
| Black pigment dispersion | 5 g. |

| Ingredients | Amounts |
| --- | --- |
| Water | to 1,000 ml. |

The resin of the latex used in the above composition comprised about 62% styrene, about 30% butadiene, about 5% vinylidene chloride and about 3% methacrylic acid. A film formed from the resin is soluble in refluxing chlorobenzene to the extent of about 13%. That the resin is crosslinked is indicated by its insolubility in Soxhlet extraction with chlorobenzene. The water soluble content of the latex is about 2% based on the weight of dried resin, with the water soluble content comprising about 10% sodium phosphate about 13% sodium oleoyl isopropanolamide sulfosuccinate and about 75% sodium dodecylbenzene sulfonate, the first mentioned ingredient being a buffering agent used in preparing the latex, and the last 2 mentioned ingredients being emulsifiers. The pH of the latex was about 7.8 and the surface tension thereof about 45–50 dynes/cm. The average particle size of the resin was about 2,000 A.

The black pigment dispersion used in the above composition is an aqueous dispersion having a total solids content of about 36%. Carbon black comprises about 30% of the dispersion. It has a pH of about 10–11.5 and a specific gravity of about 1.17. The dispersion contains a nonionic dispersing agent for the solids, and is sold under the trademark Aquablak 115.

Unless stated otherwise, the metallic surfaces coated in the examples below are unpolished cold rolled steel panels (Q-panels) 3"×4". All metallic surfaces were cleaned with a conventional alkali cleaner and rinsed with water prior to being coated.

The salt spray test used in the examples was in accordance with ASTM B-117 with the coating being scribed.

EXAMPLE 1

A series of panels were coated by immersing them in the autodeposition coating bath for approximately 90 sec. The coated panels, identified as A–F below were then removed from the autodeposition coating bath and each immersed in a different aqueous Cr-containing solution. In each instance the aqueous Cr-containing solution was prepared by adding a polyethylene latex to an aqueous solution containing 9 g./l. of $Na_2Cr_2O_7.2H_2O$, with the exception of the solution used to treat panel A. This latter solution was a control solution which contained no polyethylene.

The polyethylene latex which was added to the Cr-containing solutions was an anionically dispersed latex having a 40% solids content of polyethylene which had a molecular weight of 15,000. The concentration of polyethylene latex added to the aqueous Cr-containing solution used to treat each of the panels is indicated in the Table below. Each of the panels were immersed in the aqueous Cr-containing solutions for about 30 seconds. The panels were then placed in an oven at 160° C. for 15 minutes to fuse the coatings.

Each of the coated panels thus produced was tested for surface slip in the following manner. A paper clip was placed at one end of the panel on the coated surface. The end of the panel having the paper clip on the surface was gradually raised to incline the panel. The height to which the panel had to be raised to allow the paper clip to slide down the inclined panel was recorded. The experiment was repeated three times for each panel. The values given in the Table below represent the sum of the heights for the three repeated tests.

Additionally, each coated panel was tested for salt spray corrosion resistance for a period of 168 hours exposure and the results are reported in the Table below.

TABLE

| Panel | Polyethylene latex added to Cr Solutions ml./l. | Surface slip, height of panel in cm. | Salt Spray Corrosion Resistance* |
| --- | --- | --- | --- |
| A | 0 | 15.5 | 0–1/64 |
| B | 5 | 11.9 | 0–1/32 |
| C | 10 | 10.1 | 0–1/32 |
| D | 25 | 9.9 | 0–1/64 |
| E | 50 | 10.0 | 0–1/32 |
| F | 100 | 12.2 | 0–1/64 |

*Measured as distance from scribe line of coating failure in inches.

EXAMPLE 2

A steel panel was coated with an autodeposited coating in a manner similar to the panels of Example 1. The coated panel was then removed from the autodeposition bath and immersed in the following aqueous Cr-containing solution:

| | |
| --- | --- |
| $Na_2Cr_2O_7.2H_2O$ | 9 g. |
| Polyethylene latex* | 25 ml. |
| Polytetrafluoroethylene latex** | 1 ml. |
| Deionized water | to 1,000 ml. |

*Same as used in Example 1.
**Nonionically dispersed, 60% solids.

The coating was fused on the panel and the coated panel was tested for surface slip in a manner similar to the coatings of Example 1. In three test, the average height to which the panel needed to be raised to allow the paper clip to slide off was 3.0 cm.

What is claimed is:

1. A metallic surface having thereon a resin coating comprising the fusion product of autodeposited resin particles and fused and concentrated in the surface layer thereof resin particles, which are different than said autodeposited resin particles in having a coefficient of friction lower than that of the resin of said autodeposited resin particles, the amount of said different resin particles in the resin coating being such that said resin coating has a higher degree of surface slip than a resin coating formed from said autodeposited resin particles.

2. A surface according to claim 1 wherein said fusion product includes chromium in an amount effective to improve the corrosion-resistant properties of said resin coating.

3. A surface according to claim 1 or 2 wherein said different resin particles comprise polyethylene.

4. A surface according to claims 1 or 2 wherein said different resin particles comprise polytetrafluoroethylene.

5. A surface according to claims 1 or 2 wherein said different resin particles comprise polyethylene and polytetrafluoroethylene.

6. A metallic surface having thereon a resin coating comprising the fusion product of autodeposited resin particles, said particles prepared by copolymerizing styrene, butadiene, vinylidene chloride, and methacrylic acid, and fused and concentrated in the surface layer thereof resin particles which are different than said autodeposited resin particles in having a coefficient of friction lower than that of the resin of said autodeposited resin particles, the amount of said different resin particles in the resin coating being such that said resin coating has a higher degree of surface slip than a resin coating formed from said autodeposited resin particles.

7. A surface according to claim 6 wherein said different resin particles comprise polyethylene.

8. A surface according to claim 6 wherein said different resin particles comprise polytetrafluoroethylene.

9. A surface according to claim 6 wherein said different resin particles comprise polyethylene and polytetrafluoroethylene.

10. A metallic surface having thereon a resin coating comprising fused autodeposited resin particles and, fused and concentrated in the surface layer thereof, resin particles which are different than said autodeposited resin particles in having a coefficient of friction lower than that of the resin of said autodeposited resin particles, the amount of said different resin particles in the resin coating being such that said resin coating has a higher degree of surface slip than a resin coating formed from said autodeposited resin particles and has a higher degree of corrosion resistance than a coating comprising autodeposited resin particles of a resin having an inherently high degree of surface slip.

* * * * *